United States Patent
Jiang et al.

(10) Patent No.: US 10,102,361 B2
(45) Date of Patent: Oct. 16, 2018

(54) METHOD AND APPARATUS FOR IMPLEMENTING TOUCH KEY AND FINGERPRINT IDENTIFICATION, AND TERMINAL DEVICE

(71) Applicant: Xiaomi Inc., Beijing (CN)

(72) Inventors: Zhongsheng Jiang, Beijing (CN); Kun Yang, Beijing (CN); Jun Tao, Beijing (CN)

(73) Assignee: Xiaomi Inc., Beijing (CN)

( * ) Notice: Subject to any disclaimer, the term of this patent is extended or adjusted under 35 U.S.C. 154(b) by 345 days.

(21) Appl. No.: 14/989,318

(22) Filed: Jan. 6, 2016

(65) Prior Publication Data

US 2016/0196463 A1 Jul. 7, 2016

(30) Foreign Application Priority Data

Jan. 7, 2015 (CN) .......................... 2015 1 0008098
Jan. 30, 2015 (CN) .......................... 2015 1 0051711

(51) Int. Cl.
  *G06F 21/32* (2013.01)
  *G06F 3/044* (2006.01)
  *G06F 1/16* (2006.01)
  *G06K 9/00* (2006.01)
  *H04M 1/02* (2006.01)

(52) U.S. Cl.
  CPC ............ *G06F 21/32* (2013.01); *G06F 1/1633* (2013.01); *G06F 3/044* (2013.01); *G06K 9/0002* (2013.01); *H04M 1/026* (2013.01); *H04M 2250/22* (2013.01)

(58) Field of Classification Search
  CPC .................. G06F 1/1633; G06F 21/32; G06F 2203/04106; G06F 3/044; G06K 9/0002; H04M 1/026; H04M 2250/22

USPC .................................... 348/77; 382/124, 125
See application file for complete search history.

(56) References Cited

U.S. PATENT DOCUMENTS

2010/0156595 A1 6/2010 Wong et al.
2012/0071149 A1 3/2012 Bandyopadhyay et al.
2012/0090757 A1 4/2012 Buchan et al.
(Continued)

FOREIGN PATENT DOCUMENTS

CN 101901092 A 12/2010
CN 103168283 A 6/2013
(Continued)

OTHER PUBLICATIONS

International Search Report of PCT Application No. PCT/CN2015/093044, dated Feb. 3, 2016, issued by the State Intellectual Property Office of P.R. China as ISA (4 pages).
(Continued)

*Primary Examiner* — Behrooz M Senfi
*Assistant Examiner* — Kathleen M Walsh
(74) *Attorney, Agent, or Firm* — Finnegan, Henderson, Farabow, Garrett & Dunner LLP (57) ABSTRACT

An apparatus for implementing touch key and fingerprint identification includes a fingerprint identification sensor arranged below a cover glass of a terminal device and a capacitive touch sensor arranged below the fingerprint identification sensor. The fingerprint identification sensor is configured to collect fingerprint information applied on the cover glass. The capacitive touch sensor is configured to collect a capacitance generated on the cover glass.

14 Claims, 4 Drawing Sheets

(56) References Cited

U.S. PATENT DOCUMENTS

| | | | | |
|---|---|---|---|---|
| 2012/0105081 | A1* | 5/2012 | Shaikh | G06K 9/0002 324/686 |
| 2013/0223700 | A1 | 8/2013 | Huang et al. | |
| 2014/0292666 | A1 | 10/2014 | Shi et al. | |
| 2014/0341447 | A1* | 11/2014 | Cho | G06K 9/00087 382/124 |
| 2014/0359757 | A1 | 12/2014 | Sezan et al. | |
| 2015/0022495 | A1* | 1/2015 | Bussat | G06F 3/044 345/174 |
| 2015/0109214 | A1* | 4/2015 | Shi | G06F 3/044 345/173 |
| 2016/0132712 | A1* | 5/2016 | Yang | G06K 9/0002 348/77 |

FOREIGN PATENT DOCUMENTS

| | | |
|---|---|---|
| CN | 103745194 A | 4/2014 |
| CN | 103870817 A | 6/2014 |
| CN | 103942481 A | 7/2014 |
| CN | 104049828 A | 9/2014 |
| CN | 104063094 A | 9/2014 |
| CN | 104252277 A | 12/2014 |
| CN | 204066055 U | 12/2014 |
| CN | 104536638 A | 4/2015 |
| JP | 2000-148376 A | 5/2000 |
| JP | 2002-297305 A | 10/2002 |
| JP | 2004-318892 A | 11/2004 |
| JP | 2006-92428 A | 4/2006 |
| JP | 2007-219671 A | 8/2007 |
| JP | 2008-9616 A | 1/2008 |
| JP | 2008-502989 A | 1/2008 |
| JP | 2012-79283 A | 4/2012 |
| JP | 2013-214180 A | 10/2013 |
| KR | 10-2007-0036277 | 4/2007 |
| KR | 10-2012-0124369 | 11/2012 |
| KR | 10-2014-0134459 | 11/2014 |
| RU | 2498390 C2 | 11/2013 |
| WO | WO 01/59558 A1 | 8/2001 |
| WO | WO 2014/128260 A1 | 8/2014 |
| WO | WO 2014/143065 A1 | 9/2014 |

OTHER PUBLICATIONS

Extended European Search Report for European Application No. 15203205.8-1870 dated Apr. 11, 2016.

English translation of International Search Report for International Application No. PCT/2015/093044, dated Feb. 3, 2016.

Russian Office Action for Russian Application No. 2015156683/08 dated Mar. 28, 2017.

* cited by examiner

METHOD AND APPARATUS FOR IMPLEMENTING TOUCH KEY AND FINGERPRINT IDENTIFICATION, AND TERMINAL DEVICE

CROSS-REFERENCE TO RELATED APPLICATIONS

This application is based upon and claims priority to Chinese Patent Application No. 201510008098.X, filed Jan. 7, 2015, and Chinese Patent Application 201510051711.6, filed Jan. 30, 2015, the entire contents of both of which are incorporated herein by reference.

TECHNICAL FIELD

The present disclosure relates to structural design of terminal devices and, more particularly, to a method and apparatus for implementing touch key and fingerprint identification, and a terminal device.

BACKGROUND

Figure 1:
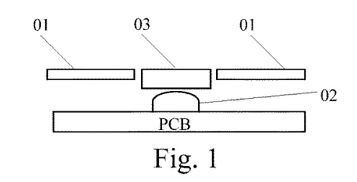
FIG. 1 is a sectional view of a touch key structure of the conventional terminal device.

A fingerprint identification function has been widely used in terminal devices such as mobile phones and tablet computers. Conventionally, the fingerprint identification function is integrated with a physical key. FIG. 1 is a cross-sectional view of a conventional physical key with the fingerprint identification function. As shown in FIG. 1, the conventional physical key includes a cover glass 01 covering a printed circuit board (PCB), a button 02 formed over the PCB, and a fingerprint identification sensor 03 formed in a hole in the cover glass 01 and over the button 02. When a user touches the fingerprint identification sensor 03 slightly, the physical key only identifies the fingerprint. On the other hand, when the user presses the fingerprint identification sensor 03 for a certain distance, the button 02 is triggered, and the physical key identifies two actions including the fingerprint identification and the key actuation. Which one or both of the actions to output depends on need.

SUMMARY

In accordance with the present disclosure, there is provided an apparatus for implementing touch key and fingerprint identification. The apparatus includes a fingerprint identification sensor arranged below a cover glass of a terminal device and a capacitive touch sensor arranged below the fingerprint identification sensor. The fingerprint identification sensor is configured to collect fingerprint information applied on the cover glass. The capacitive touch sensor is configured to collect a capacitance generated on the cover glass.

Also in accordance with the present disclosure, there is provided a method for implementing touch key and fingerprint identification. The method includes, when a turn-on signal is received, collecting fingerprint information applied on a cover glass, and analyzing and processing the fingerprint information to obtain a fingerprint analysis result. The method further includes, when a cut-off signal is received, collecting a capacitance generated on the cover glass, and analyzing the capacitance to obtain a capacitance variation.

Also in accordance with the present disclosure, there is provided an apparatus for implementing touch key and fingerprint identification. The apparatus includes a processor and a memory storing instructions executable by the processor. When a turn-on signal is received, the instructions cause the processor to collect fingerprint information applied on a cover glass, and analyze and process the fingerprint information to obtain a fingerprint analysis result. When a cut-off signal is received, the instructions cause the processor to collect a capacitance generated on the cover glass, and analyze the capacitance to obtain a capacitance variation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 2:
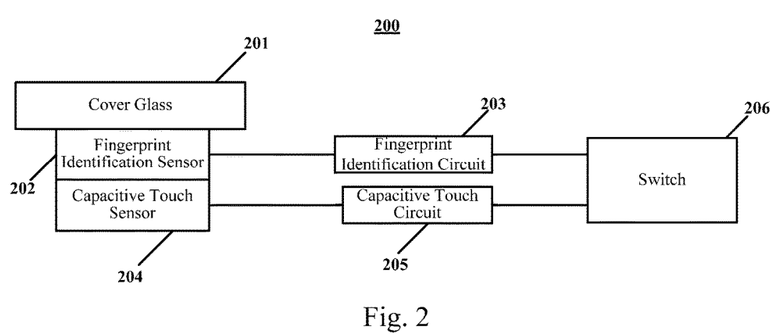
FIG. 2 is a block diagram illustrating an apparatus for implementing touch key and fingerprint identification, according to an exemplary embodiment.

The embodiments of the present disclosure provide an apparatus for implementing touch key and fingerprint identification. FIG. 2 schematically shows an apparatus 200 according to an exemplary embodiment. The apparatus 200 can be implemented in a terminal device. As shown in FIG. 2, the apparatus 200 includes a cover glass 201, a fingerprint identification sensor 202 arranged below the cover glass 201 for collecting fingerprint information applied on the cover glass 201, and a fingerprint identification circuit 203 coupled to the fingerprint identification sensor 202 and used for analyzing and processing the fingerprint information collected by the fingerprint identification sensor 202 to obtain a fingerprint analysis result. The apparatus 200 further includes a capacitive touch sensor 204 arranged below the fingerprint identification sensor 202 and used for collecting a capacitance generated on the cover glass 20 and a capacitive touch circuit 205 coupled to the capacitive touch sensor 204 and used for analyzing the capacitance collected by the capacitive touch sensor 204 to obtain a capacitance variation. The apparatus 200 also includes a switch 206. When the switch 206 receives a turn-on signal, the switch 206 turns on the fingerprint identification sensor 202 and the fingerprint identification circuit 203, and disconnects the capacitive touch sensor 204 and the capacitive touch circuit 205. On the other hand, when the switch 206 receives a cut-off signal, the switch 206 turns on the capacitive touch sensor 204 and the capacitive touch circuit 205, and disconnects the fingerprint identification sensor 202 and the fingerprint identification circuit 203.

As described above, the fingerprint identification sensor 202 is arranged above the capacitive touch sensor 204 and directly below the glass cover 201. Therefore, when a user operates the terminal device using a finger, a distance from the fingerprint identification sensor 202 to the finger is relatively short. Further, the fingerprint identification sensor 202 includes multiple layers of circuits, which can provide a shielding function. Accordingly, when the fingerprint identification function is activated, signals of the capacitive touch sensor 204 reduce greatly, and thus the touch function is hindered. On the other hand, when the touch key function is activated, the multiple-layer circuits inside the fingerprint identification sensor 202 are in a float status. Thus, although the distance from the capacitive touch sensor 204 to the finger is relatively long due to the existence of the fingerprint identification sensor 202, the signals of the capacitive touch sensor 204 are not significantly affected due to a relatively high signal-to-noise ratio (SNR) of the capacitive touch sensor 204. Accordingly, the capacitive touch key function can be achieved.

Figure 3:
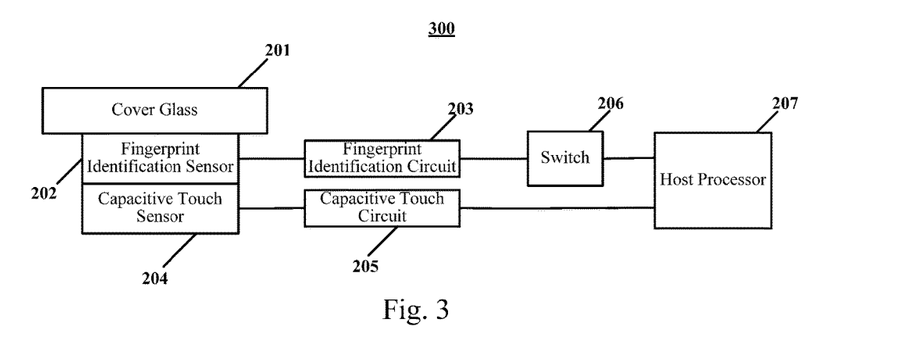
FIG. 3 is a block diagram illustrating another apparatus for implementing touch key and fingerprint identification, according to an exemplary embodiment.

FIG. 3 schematically shows an apparatus 300 according to another exemplary embodiment. The apparatus 300 is similar to the apparatus 200, except that the apparatus 300 further includes a host processor 207, which is coupled to the series connection of the switch 206, the fingerprint identification circuit 203, and the fingerprint identification sensor 202. The host processor 207 is configured to send the turn-on signal or the cut-off signal to the switch 206 and to perform an authentication according to the fingerprint analysis result obtained by the fingerprint identification circuit 203. For example, the host processor 207 performs the authentication by comparing the fingerprint analysis result with pre-stored fingerprint data. The pre-stored fingerprint data may include identities of users and the corresponding fingerprint feature data. The host processor 207 extracts the fingerprint feature from the fingerprint analysis result, and compares the extracted fingerprint feature with fingerprint features stored in the fingerprint data to determine the identity of the current user. As shown in FIG. 3, the host processor 207 is also coupled to the capacitive touch circuit 205 and is configured to judge whether the cover glass 201 receives a touch key operation according to the capacitance variation obtained by the capacitive touch circuit 205.

The host processor 207 can send the turn-on signal or the cut-off signal to the switch 206 according to an instruction from the user or the requirement of a higher-level application. For example, when the user or the higher-level application desires to identify the fingerprint, the user or the higher-level application can instruct the host processor 207 to send the turn-on signal to the switch 206. On the other hand, and when the user or the higher-level application desires to perform a key operation, the user or the higher-level application can instruct the host processor 207 to send the cut-off signal to the switch 206.

In some embodiments, the host processor 207 includes a communication interface, a first processor, and a second processor. The communication interface is configured to send the turn-on signal or the cut-off signal to the switch 206. The first processor forms a series loop with the fingerprint identification circuit 203 and the fingerprint identification sensor 202, and is configured to compare the fingerprint analysis result obtained by the fingerprint identification circuit 203 with the pre-stored fingerprint data to determine the identity of the current user. The second processor is coupled to the capacitive touch circuit 205, and is configured to judge whether the capacitance variation obtained by the capacitive touch circuit 205 exceeds a predefined value to determine whether the cover glass receives a touch key operation.

In some embodiments, when the fingerprint identification sensor 202 and the fingerprint identification circuit 203 are disconnected, the fingerprint identification sensor 202 is in a float status.

According to the present disclosure, the host processor 207 sends a control signal, such as the turn-on signal or the cut-off signal, to the switch 206 via the communication interface to control the operation statuses of the fingerprint identification sensor 202 and the capacitive touch sensor 204. When the host processor 207 sends the turn-on signal to the switch 206, the switch 206 controls the fingerprint identification sensor 202 and the fingerprint identification circuit 203 to turn on according to the received turn-on signal, and controls the capacitive touch sensor 204 and the capacitive touch circuit 205 to disconnect. At this time, the fingerprint identification sensor 202 is in an operating state. Thus, when a current user touches an upper surface of the cover glass 201 by his/her finger, the fingerprint identification sensor 202 collects fingerprint information on the cover glass 201, and sends the fingerprint information to the fingerprint identification circuit 203. The fingerprint identification circuit 203 analyzes and processes the fingerprint information to obtain a fingerprint identification result, and sends the fingerprint identification result to the first processor in the host processor 207. The first processor compares the received fingerprint identification result with the pre-stored fingerprint data to determine an identity of the current user. Since there are multiple layers of circuits inside the fingerprint identification sensor 202, and these circuits directly perform a shielding function, the capacitive touch signals of the capacitive touch sensor 204 will reduce greatly. As a result, the touch function of the capacitive touch sensor 204 is hindered. On the other hand, when the host processor 207 sends the cut-off signal to the switch 206, the switch 206 controls the fingerprint identification sensor 202 and the finger identification circuit 203 to disconnect, and controls the capacitive touch sensor 204 and the capacitive touch circuit 205 to turn on. At this time, the fingerprint identification sensor 202 is in a float status, i.e., is disconnected from the host processor 207, and the capacitive touch sensor 204 starts to operate. When the current user touches the upper surface of the cover glass 201 by his/her finger, the capacitive touch sensor 204 collects the capacitance generated on the cover glass 201 and sends a signal representative of the collected capacitance to the capacitive touch circuit 205. The capacitive touch circuit 205 analyzes the capacitance collected by the capacitive touch sensor 204 to obtain a capacitance variation, and sends the capacitance variation to the second processor in the host processor 207. The second processor compares the received capacitance variation with a predefined value. If the capacitance variation exceeds the predefined value, the second processor determines that the cover glass 201 receives a touch key operation.

Also in accordance with the present disclosure, there is provided a terminal device, which includes an apparatus for implementing touch key and fingerprint identification consistent with embodiments of the present disclosure, such as one of the exemplary apparatuses described above.

Figure 4:
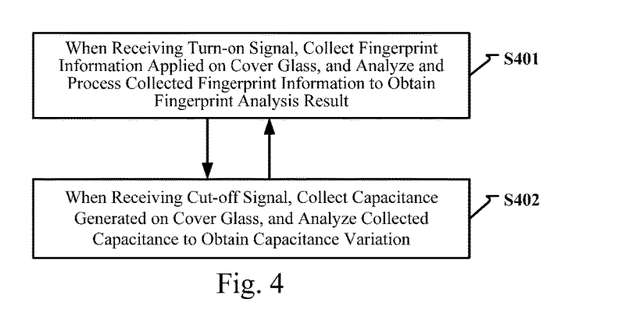
FIG. 4 is a flow chart illustrating a method for implementing touch key and fingerprint identification, according to an exemplary embodiment.

FIG. 4 is a flow chart of a method for implementing touch key and fingerprint identification according to an exemplary embodiment. The method can be implemented, for example, in a terminal device. As shown in FIG. 4, at S401, when a turn-on signal is received, fingerprint information applied on a cover glass is collected, and the collected fingerprint information is analyzed and processed to obtain a fingerprint analysis result. At S402, when a cut-off signal is received, a capacitance generated on the cover glass is collected, and the collected capacitance is analyzed to obtain a capacitance variation.

Figure 5:
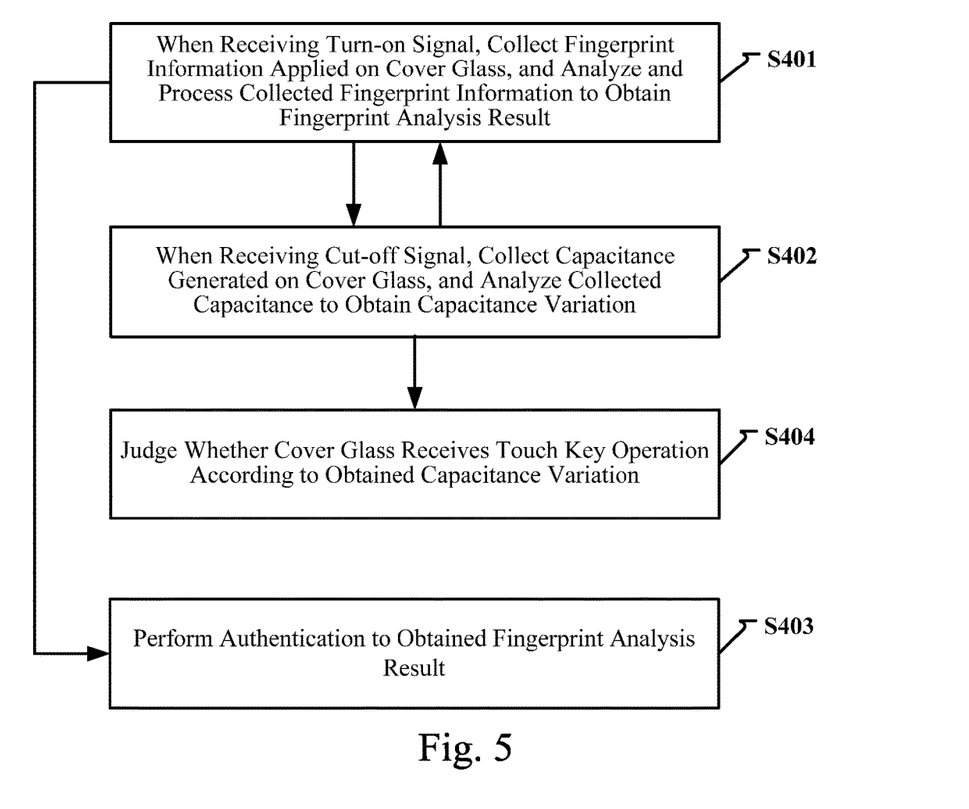
FIG. 5 is a flow chart illustrating another method for implementing touch key and fingerprint identification, according to an exemplary embodiment.

FIG. 5 is a flow chart of a method for implementing touch key and fingerprint identification according to another exemplary embodiment. As shown in FIG. 5, at S403, an authentication on the obtained fingerprint analysis result is performed. At S404 whether the cover glass receives a touch key operation is judged according to the obtained capacitance variation.

In some embodiments, performing the authentication on the obtained fingerprint analysis result includes comparing the obtained fingerprint analysis result with pre-stored fingerprint data to determine an identity of a current user. In some embodiments, judging whether the cover glass receives the touch key operation includes judging whether the obtained capacitance variation exceeds a predefined value, and determining that the cover glass receives the touch key operation when the capacitance variation exceeds the predefined value.

According to the present disclosure, there is also provided an apparatus for implementing touch key and fingerprint identification. The apparatus includes a processor and a memory storing instructions executable by the processor. The instructions, when executed by the processor, cause the processor to perform a method consistent with embodiments of the present disclosure, such as one of the exemplary methods described above.

Figure 6:
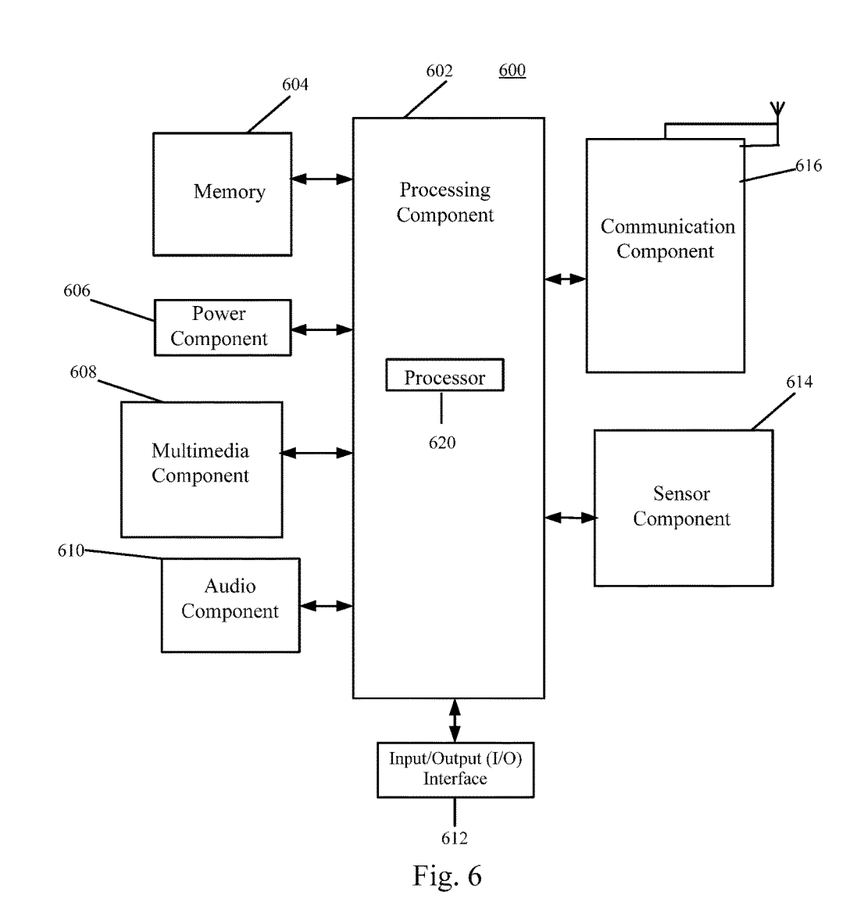
FIG. 6 is a block diagram illustrating an apparatus suitable for implementing touch key and fingerprint identification, according to an exemplary embodiment.

FIG. 6 is a block diagram of a device 600 for implementing touch key and fingerprint identification, according to an exemplary embodiment. For example, the device 600 may be a mobile phone, a computer, a digital broadcast terminal, a messaging device, a gaming console, a tablet, a medical device, exercise equipment, a personal digital assistant, or the like.

Referring to FIG. 6, the device 600 includes one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, 3G, 4G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

According to the present disclosure, a capacitive touch sensor and a fingerprint identification sensor are vertically integrated. The functions of the capacitive touch sensor and the fingerprint identification sensor can be turned on by a switch according to the need of the user or higher-level applications, and thus do not affect each other during operation. As such, a real integration of the fingerprint identification function and the touch key function can be achieved. In addition, since it is not necessary to make a hole in the cover glass for placing the fingerprint identification sensor, the aesthetic appearance of the whole device, the structural strength of the cover glass, and the user experience can be improved. Further, even if a hole is provided in the cover glass, the integrated functions would not be affected. Therefore, according to the present disclosure, cover glass with or without holes can be used, which provides a higher flexibility when choosing the cover glass.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An apparatus for implementing touch key and fingerprint identification, comprising:
    a fingerprint identification sensor arranged below a cover glass of a terminal device and configured to collect fingerprint information applied on the cover glass;
    a capacitive touch sensor arranged below the fingerprint identification sensor and configured to collect a capacitance generated on the cover glass;
    a fingerprint identification circuit coupled to the fingerprint identification sensor, and configured to analyze and process the fingerprint information to obtain a fingerprint analysis result;
    a capacitive touch circuit coupled to the capacitive touch sensor, and configured to analyze the capacitance to obtain a capacitance variation; and
    a switch configured to:
        turn on the fingerprint identification sensor and the fingerprint identification circuit and disconnect the capacitive touch sensor and the capacitive touch circuit according to a turn-on signal, and
        turn on the capacitive touch sensor and the capacitive touch circuit and disconnect the fingerprint identification sensor and the fingerprint identification circuit according to a cut-off signal,
    wherein the fingerprint identification sensor comprises multiple layers of circuits providing a shielding function reducing capacitive touch signals, the multiple layers of circuits being in a float status when the switch receives the cut-off signal, and the capacitive touch sensor has a high signal-noise-ratio.

2. The apparatus of claim 1, further comprising:
    a host processor coupled to the switch and the capacitive touch circuit, the host processor being configured to:
        send the turn-on signal or the cut-off signal to the switch,
        perform an authentication according to the fingerprint analysis result, and
        judge whether the cover glass receives a touch key operation according to the capacitance variation.

3. The apparatus of claim 2, wherein the host processor includes:
    a communication interface configured to send the turn-on signal or the cut-off signal to the switch;
    a first processor coupled to the switch and configured to compare the fingerprint analysis result with pre-stored fingerprint data to determine an identity of a current user; and
    a second processor coupled to the capacitive touch circuit and configured to judge whether the capacitance variation exceeds a predefined value to determine whether the cover glass receives the touch key operation.

4. The apparatus of claim 1, wherein the fingerprint identification sensor is configured to be in a float status when the fingerprint identification sensor and the fingerprint identification circuit are disconnected.

5. A terminal device, comprising the apparatus of claim 1.

6. A terminal device, comprising the apparatus of claim 2.

7. A terminal device, comprising the apparatus of claim 3.

8. A terminal device, comprising the apparatus of claim 4.

9. A method for implementing touch key and fingerprint identification, comprising:
    collecting, when a turn-on signal is received, fingerprint information applied on a cover glass by a fingerprint identification sensor, and analyzing and processing the fingerprint information to obtain a fingerprint analysis result by a fingerprint identification circuit coupled to the fingerprint identification sensor; and collecting, when a cut-off signal is received, a capacitance generated on the cover glass by a capacitive touch sensor, and analyzing the capacitance to obtain a capacitance variation by a capacitive touch circuit coupled to the capacitive touch sensor, wherein the fingerprint identification sensor comprises multiple layers of circuits providing a shielding function reducing capacitive touch signals, the multiple layers of circuits being in a float status when the cut-off signal is received, and the capacitive touch sensor has a high signal-noise-ratio.

10. The method of claim 9, further comprising:
performing an authentication on the fingerprint analysis result.

11. The method of claim 10, wherein performing the authentication includes:
comparing the fingerprint analysis result with pre-stored fingerprint data to determine an identity of a current user.

12. The method of claim 9, further comprising:
judging whether the cover glass receives a touch key operation according to the capacitance variation.

13. The method of claim 12, wherein judging whether the cover glass receives the touch key operation includes:
judging whether the capacitance variation exceeds a pre-defined value; and
determining that the cover glass receives the touch key operation if the capacitance variation exceeds the pre-defined value.

14. An apparatus for implementing touch key and fingerprint identification, comprising:
a processor; and
a memory storing instructions that, when executed by the processor, cause the processor to:
collect, when receiving a turn-on signal, fingerprint information applied on a cover glass by a fingerprint identification sensor, and analyze and process the fingerprint information to obtain a fingerprint analysis result by a fingerprint identification circuit coupled to the fingerprint identification sensor; and
collect, when receiving a cut-off signal, a capacitance generated on the cover glass by a capacitive touch sensor, and analyze the capacitance to obtain a capacitance variation by a capacitive touch circuit coupled to the capacitive touch sensor,
wherein the fingerprint identification sensor comprises multiple layers of circuits providing a shielding function reducing capacitive touch signals, the multiple layers of circuits being in a float status when the cut-off signal is received, and the capacitive touch sensor has a high signal-noise-ratio.

* * * * *